United States Patent
Valkonen et al.

(10) Patent No.: US 9,982,004 B2
(45) Date of Patent: May 29, 2018

(54) METHOD FOR RECOVERING LOW MOLECULAR WEIGHT LIGNIN FROM A FILTRATE

(71) Applicant: UPM-Kymmene Corporation, Helsinki (FI)

(72) Inventors: Sanna Valkonen, Lappeenranta (FI); Kati Oinonen, Imatra (FI); Juha-Pekka Koitto, Lappeenranta (FI); Jenni Leppänen, Lappeenranta (FI)

(73) Assignee: UPM-KYMMENE CORPORATION, Helsinki (FI)

( * ) Notice: Subject to any disclaimer, the term of this patent is extended or adjusted under 35 U.S.C. 154(b) by 0 days. days.

(21) Appl. No.: 14/420,845

(22) PCT Filed: Aug. 22, 2013

(86) PCT No.: PCT/FI2013/050817
§ 371 (c)(1),
(2) Date: Feb. 10, 2015

(87) PCT Pub. No.: WO2014/029918
PCT Pub. Date: Feb. 27, 2014

(65) Prior Publication Data
US 2015/0203522 A1    Jul. 23, 2015

(51) Int. Cl.
*C07G 1/00* (2011.01)
*D21C 11/00* (2006.01)

(52) U.S. Cl.
CPC ............ *C07G 1/00* (2013.01); *D21C 11/0007* (2013.01)

(58) Field of Classification Search
CPC .............................. C07G 1/00; D21C 11/0007
See application file for complete search history.

(56) References Cited

U.S. PATENT DOCUMENTS 2,997,466 A * 8/1961 Ball .................... D21C 11/0007
530/500
3,048,576 A * 8/1962 Ball .................... D21C 11/0007
530/500
(Continued)

FOREIGN PATENT DOCUMENTS

EP    0 829 524 A1    3/1998
EP    2 130 802 A1    12/2009
(Continued)

OTHER PUBLICATIONS

Axegard ("The kraft pulp mill as a biorefinery." Division Fiber, Pulp Energy and Chemicals. STFI-Packforsk PO Box 5604 (2007): 1-6).*
(Continued)

*Primary Examiner* — Liam J Heincer
(74) *Attorney, Agent, or Firm* — Nixon Peabody LLP

(57) ABSTRACT

The invention relates to a method for recovering low molecular weight lignin from a filtrate, wherein the low molecular weight lignin includes lignin molecules having a molecular weight of 3000 g/mol or lower, wherein the filtrate is obtained from a process where lignin is precipitated from black liquor and the formed precipitate is separated therefrom by filtration resulting in the filtrate including low molecular weight lignin being formed, and wherein the method includes the following steps: a) adjusting the pH of the filtrate to a value of 3-4 for precipitating lignin in the filtrate; b) separating the precipitated lignin from the filtrate; c) reslurrying the separated lignin until the dry solids content of the slurry is 25-40 weight-% and adjusting the pH of the slurry to a value of 2-3; d) washing the slurry; and e) separating the lignin from the slurry.

18 Claims, 1 Drawing Sheet

(56) References Cited

U.S. PATENT DOCUMENTS

| | | | |
|---|---|---|---|
| 4,551,151 A | 11/1985 | Dilling | |
| 4,584,057 A | 4/1986 | Rowe et al. | |
| 4,764,596 A * | 8/1988 | Lora | C07D 307/50 162/16 |
| 5,288,857 A * | 2/1994 | Aarsrud | C08H 6/00 530/500 |
| 5,635,024 A * | 6/1997 | Shall | D21C 11/0007 162/16 |
| 5,866,642 A | 2/1999 | McVay et al. | |
| 8,815,052 B2 * | 8/2014 | Ohman | D21C 11/0007 162/16 |
| 9,260,464 B2 * | 2/2016 | Lake | C07G 1/00 |
| 2008/0047674 A1 * | 2/2008 | Ohman | D21C 11/0007 162/16 |
| 2008/0051566 A1 * | 2/2008 | Ohman | D21C 11/0007 530/500 |
| 2008/0214796 A1 * | 9/2008 | Tomani | D21C 11/0007 530/500 |
| 2010/0041879 A1 * | 2/2010 | Stigsson | C07G 1/00 536/127 |
| 2010/0325947 A1 * | 12/2010 | Ohman | D21C 11/0007 44/606 |
| 2011/0245381 A1 * | 10/2011 | Winterowd | C08L 61/06 524/14 |
| 2011/0253326 A1 * | 10/2011 | Sherman | D21C 3/024 162/55 |
| 2011/0297340 A1 * | 12/2011 | Kouisni | D21C 11/0007 162/16 |
| 2012/0226029 A1 * | 9/2012 | Dodd | D21C 11/0007 530/500 |
| 2013/0203972 A1 * | 8/2013 | Miettinen | C07G 1/00 530/500 |
| 2013/0217869 A1 * | 8/2013 | Ters | C07G 1/00 530/507 |
| 2013/0331555 A1 * | 12/2013 | Malkki | C07G 1/00 530/502 |
| 2014/0200334 A1 * | 7/2014 | Lake | D21C 11/0007 530/500 |
| 2014/0249271 A1 * | 9/2014 | Pietarinen | C08H 6/00 524/799 |
| 2014/0275498 A1 * | 9/2014 | Littorin | D21C 11/0007 530/500 |
| 2014/0288284 A1 * | 9/2014 | Bjorklund | C07G 1/00 530/500 |
| 2015/0075738 A1 * | 3/2015 | Wimby | C08H 8/00 162/16 |
| 2015/0087781 A1 * | 3/2015 | Valkonen | C08H 6/00 524/735 |

FOREIGN PATENT DOCUMENTS

| | | |
|---|---|---|
| WO | WO 86/07070 A1 | 12/1986 |
| WO | WO 2004/029356 AI | 4/2004 |
| WO | 2009/104995 A1 | 8/2009 |

OTHER PUBLICATIONS

Zhu et al. (Equilibrium of Lignin Precipitation, Proceedings of the 16th ISWFPC, 2011).*

Search Report for Finish Application No. 20125880 dated Jun. 20, 2013.

International Search Report for PCT/FI2013/050817 dated Oct. 23, 2013.

Alriols, M. G. et al., *Combined organsolv and ultrafiltration lignocellulosic biorefinery process*, Chemical Engineering Journal 157 (2010) 113-120.

Antonsson, S. et al., *Low $M_W$-lignin fractions together with vegetable oils as available oligomers for novel paper-coating applications as hydrophobic barrier*, Industrial Crops and Products 27 (2008) 98-103.

Mussatto, S. I. et al., *Lignin recovery from brewer's spent grain black liquor*, Carbohydrate Polymers 70 (2007) 218-223.

Toledano, A. et al., *Comparative study of lignin fractionation by ultrafiltration and selective precipitation*, Chemical Engineering Journal 157 (2010) 93-99.

Communication pursuant to Article 94(3) EPC in related Application No. 13 759 800.9-1462, dated Mar. 2, 2017.

* cited by examiner

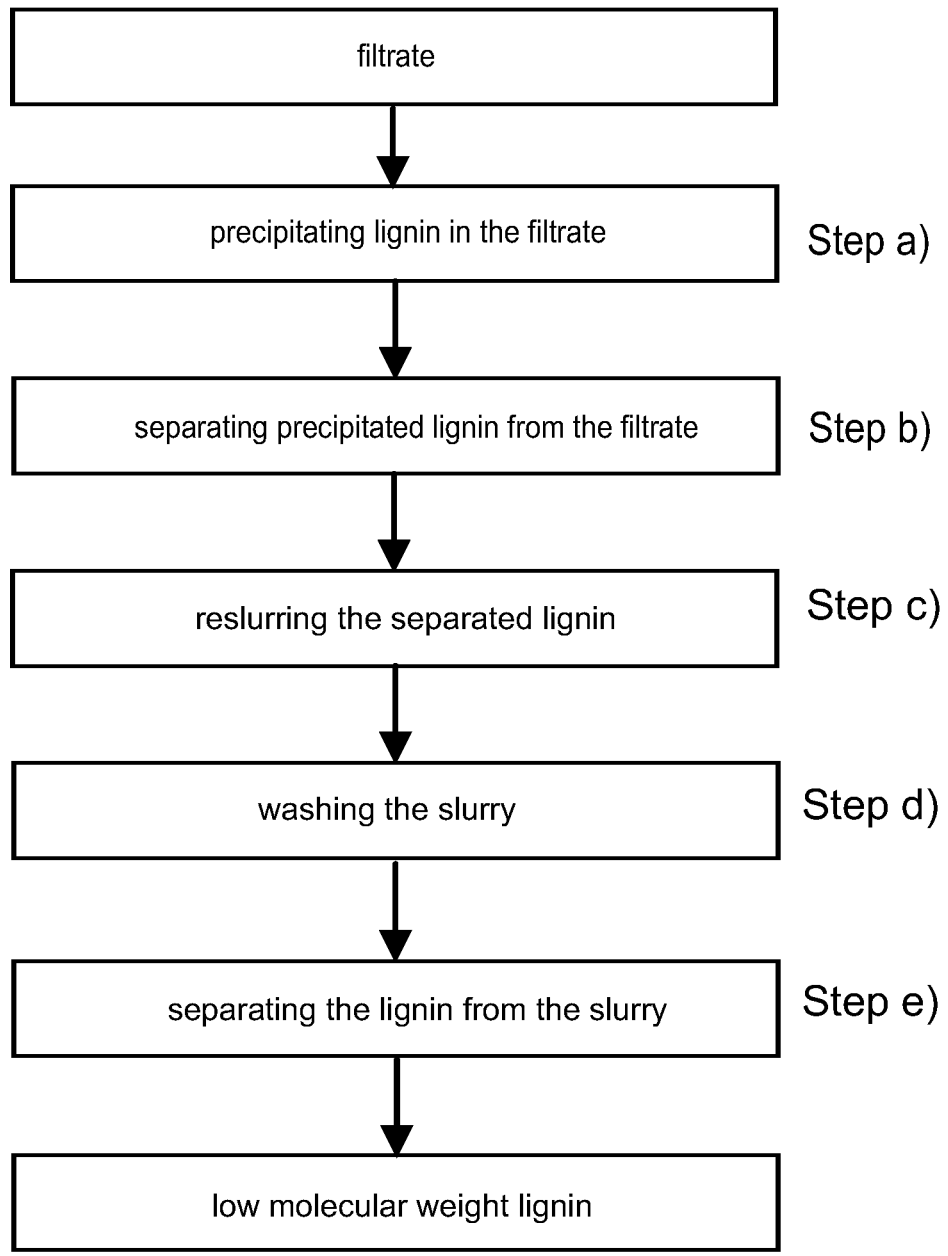

METHOD FOR RECOVERING LOW MOLECULAR WEIGHT LIGNIN FROM A FILTRATE

FIELD

The invention relates to a method for recovering low molecular weight lignin from a filtrate, to lignin obtained with the method, and to the uses thereof.

BACKGROUND

Lignin is a natural polymer, which can be extracted from e.g. wood. As lignin is a natural biopolymer its use as a component in e.g. glues instead of synthetic materials has been investigated in order to come up with more environmentally friendly applications.

Lignin can be separated from e.g. wood during e.g. a pulping process during which lignin is delignificated and dissolved from the wood matrix into a cooking liquor. Different methods can be used for recovering lignin from the cooking liquor. For example, lignin can be precipitated from the cooking liquor by using an acidic reagent, such as $CO_2$ or sulphuric acid, after which the precipitated lignin can be separated by e.g. filtration. Attempts have also been made to fractionate lignin according to the molecular weight of lignin in order to recover lignin with specific properties to be used in specific applications. For example ultrafiltration, nanofiltration and sequential precipitation have been used for fractionating lignin.

Lignin can be precipitated from black liquor by lowering the pH e.g. from 13-14 to 8-9. However, low molecular weight lignin is not precipitated in such pH values but stays in the mother liquor. When the precipitated lignin is separated from the remaining liquor, the low molecular weight lignin will end up in a waste filtrate with cooking chemicals and impurities. The waste filtrate is often circulated to an evaporation plant and burned in order to recover cooking chemicals.

Low molecular weight lignin can be recovered from e.g. kraft lignin by ultrafiltration. However, drawbacks of the ultrafiltration process are a rather low yield and an expensive procedure.

The inventors have therefore recognized a need for an effective method for recovering also low molecular weight lignin from black liquor.

SUMMARY

The purpose of the invention is to provide a new type of method for recovering low molecular weight lignin from a filtrate, which is obtained from a process where black liquor is processed, and to provide low molecular weight lignin for different applications.

BRIEF DESCRIPTION OF THE DRAWINGS

The accompanying drawing, which is included to provide a further understanding of the invention and constitutes a part of this specification, illustrates an embodiment of the invention and together with the description helps to explain the principles of the invention. In the drawing:

FIG. 1 is a flow chart illustration of a method according to one embodiment of the present invention.

DETAILED DESCRIPTION OF THE INVENTION

The present invention relates to a method for recovering low molecular weight lignin from a filtrate, wherein the low molecular weight lignin comprises lignin molecules having a molecular weight of 3000 g/mol or lower, and wherein the filtrate is obtained from a process where lignin is precipitated from black liquor and the formed precipitate is separated therefrom by filtration resulting in the filtrate comprising low molecular weight lignin being formed, and wherein the method comprises the following steps:

a) adjusting the pH of the filtrate to a value of 3-4 for precipitating lignin in the filtrate;
b) separating the precipitated lignin from the filtrate;
c) reslurrying the separated lignin until the dry solids content of the slurry is 25-40 weight-% and adjusting the pH of the slurry to a value of 2-3;
d) washing the slurry; and
e) separating the lignin from the slurry.

The filtrate to be treated by the method according to the present invention is received or originates from a process, where lignin is being separated or recovered from black liquor. Black liquor is an alkaline aqueous solution of lignin residues, hemicellulose, and inorganic chemicals that can be received from e.g. a kraft pulping process or from a soda process. The black liquor comprises components originating from different softwood and hardwood species in various proportions. Lignin can be separated from the black liquor by different techniques including e.g. precipitation and filtration. Lignin is usually precipitated from black liquor by lowering the pH of the black liquor from e.g. 13-14 to e.g. 8-9 by using an acidic reagent, such as $CO_2$, whereby main part of the lignin in the black liquor is precipitated. The precipitated lignin is then separated resulting in the formation of lignin cakes and a filtrate. However, low molecular weight lignin is usually not precipitated at such pH values. The low molecular weight lignin will thus end up in the filtrate together with e.g. cooking chemicals and impurities. Usually this waste filtrate received from the lignin precipitation process is circulated to an evaporation plant and burned in order to recover cooking chemicals.

The inventors surprisingly found out that recovering of also the low molecular weight lignin from black liquor is possible by the method according to the present invention. By the method according to the present invention it is advantageously possible to recover, from black liquor, a separate fraction of low molecular weight lignin having valuable properties for further applications. Thus, the filtrate to be treated by the method according to the present invention comprises lignin molecules of low molecular weight as at least the most of the high molecular weight lignin present in black liquor has already been separated from the black liquor at a previous stage.

Low molecular weight lignin comprises lignin molecules of low molecular weight. Low molecular weight lignin comprises lignin molecules having a molecular weight of 3000 g/mol or lower. This kind of lignin molecule includes 1-15 phenylpropane units. The phenylpropane can comprise OH- and/or OMe-groups attached thereto. The phenylpropane units are crosslinked to each other through ether linkages. One phenylpropane comprises nine carbon atoms.

In one embodiment of the present invention the lignin content is 5-25 weight-%, preferably 10-20 weight-%, and more preferably 14-16 weight-%, of dry solids in the filtrate to be treated in accordance with the method according to the present invention.

In one embodiment of the present invention the pH of the filtrate is adjusted in step a) by using an acidifying agent. In one embodiment of the present invention the concentration of the acidifying agent is 30-60 weight-%, preferably 45-55 weight-%, and more preferably about 50 weight-%. The use of a high concentration of the acidifying agent has the advantage that gratuitous dilution of the filtrate can be avoided in step a). In one embodiment of the present invention the pH of the filtrate is adjusted in step a) by adding sulphuric acid ($H_2SO_4$) and/or sodium sesquisulfate ($Na_3H(SO_4)_2$) to the filtrate.

In one embodiment of the present invention step a) comprises adjusting the temperature of the filtrate to 50-70° C.

In one embodiment of the present invention step a) comprises adding antifoaming agent to the filtrate. The antifoaming agent can be used for aiding in the precipitation of lignin in step a). As an example only it can be mentioned that a silicon based antifoaming agent can be used. In one embodiment of the present invention the antifoaming agent is selected from a group consisting of oil and water based emulsions, oils, waxes, and glycols. Long chain fatty alcohols, fatty acid soaps or esters, polyethylene glycol and polypropylene glycol can be mentioned as examples of antifoaming agents that can be used in the method according to the present invention.

In one embodiment of the present invention step b) comprises separating the precipitated lignin from the filtrate by a vacuum filter or a pressure filter after a delay time of 5-15 hours. By the expression "delay time" should be understood in this specification, unless otherwise stated, the time the lignin is allowed to precipitate in the filtrate at the pH of 3-4 before being separated from the filtrate.

In one embodiment of the present invention step b) comprises allowing the precipitated lignin to settle down and then syphoning off the excess filtrate.

In one embodiment of the present invention step c) comprises reslurrying the separated lignin at a temperature of 50-70° C.

In one embodiment of the present invention step c) preferably comprises reslurrying the separated lignin until the dry solids content of the slurry is below 30 weight-%.

In one embodiment of the present invention step c) comprises adjusting the pH of the slurry by adding an acidifying agent to the slurry. In one embodiment of the present invention step c) comprises adjusting the pH of the slurry by adding sulphuric acid to the slurry. In one embodiment of the present invention step c) preferably comprises adjusting the pH of the slurry to a value of 2.3-2.5, and more preferably to a value of about 2.5.

In one embodiment of the present invention step c) comprises mixing the formed slurry for 15 minutes-5 hours, preferably 15 minutes-2 hours, at a temperature of 50-70° C.

As a result of decreasing the pH of the slurry in step c) inorganic matter is dissolved from lignin and the lignin is purified.

In one embodiment of the present invention step d) of washing the slurry comprises diluting the slurry with water until the dry solids content of the slurry is below 20 weight-%, preferably below 10 weight-%, and more preferably about 5 weight-%, and mixing the slurry for 0.5-5 hours, preferably for 0.5-2 hours. In one embodiment of the present invention step d) is carried out at a temperature of 20-70° C.

Washing the slurry in step d) enhances the removal of inorganic matter from lignin to the washing water.

In one embodiment of the present invention step e) of separating lignin from the slurry comprises allowing lignin to settle down and then syphoning off the excess liquid. In one embodiment of the present invention step e) comprises allowing lignin to settle down for 2-24 hours, preferably for 2-16 hours.

In one embodiment of the present invention the method further comprises step f) of drying the lignin separated from the slurry.

In one embodiment of the present invention the method further comprises the step g) of grinding the dried lignin.

The inventors surprisingly found out that by the method according to the present invention it was possible to recover low molecular weight lignin from a waste filtrate formed in the process where lignin, especially high molecular weight lignin, is precipitated and separated from black liquor. Advantageously low molecular weight lignin, being reactive and having valuable properties, can be recovered instead of ending up e.g. in an evaporation plant where it would be burned. The method according to the present invention advantageously results in a fraction of reactive lignin being formed for further use.

The present invention further relates to lignin obtainable by the method according to the present invention.

The present invention further relates to the use of the lignin for the preparation of a binder composition or an adhesive composition. The recovered lignin can also be used for the preparation of various lignin modifications or functionalized lignin.

The low molecular weight lignin recovered from the filtrate, originating from a process where lignin is precipitated and separated from black liquor, by the method according to the present invention can be used together with e.g. a polymerizable substance or substances, crosslinking agent, and a catalyst for producing a binder composition. The produced binder composition can be used as such or as a part of an adhesive composition together with one or more adhesive components selected from a group consisting of other binders, extenders, additives, catalysts and fillers.

The binder composition and/or the adhesive composition can be used for gluing applications. E.g. a layered composite structure can be formed of two or more layers including at least one wood veneer layer, wherein the layers are arranged the one above the other and combined by means of gluing with the binder composition and/or the adhesive composition. In this specification, unless otherwise stated, the term "wood veneer" is used to address a veneer, which can be formed of any material, e.g. wood-based material, fiber material, composite material or the like. In this context, the thickness of the wood veneer can be varied. Typically the thickness of wood veneer is below 3 mm.

The layered composite structure can be selected from a group consisting of a wood panel product, a plywood product, a composite product, and a pressed panel product. The layered composite structure can be formed of a number of layers, preferably wood veneer layers, in which the layers are laid one upon the other and glued together. The layered composite structure can also be formed of a number of paper or fiber mat layers.

The formed adhesive composition can be used for gluing a wood product. The wood product can be selected from a group consisting of a wood board, a wood veneer, and a wood bar.

The embodiments of the invention described hereinbefore may be used in any combination with each other. Several of the embodiments may be combined together to form a further embodiment of the invention. A method, lignin or a use, to which the invention is related, may comprise at least one of the embodiments of the invention described hereinbefore.

An advantage of the present invention is that lignin having low molecular weight can be recovered from a filtrate, which is formed in a process where lignin is precipitated and separated from black liquor and which usually ends up as waste in e.g. an evaporation plant.

An advantage of the present invention is that a fraction of low molecular weight lignin being more reactive than high molecular weight lignin can be recovered for further use. More reactive, low molecular weight lignin can be used e.g. in chemical synthesis where more reactivity is needed.

An advantage of the low molecular weight lignin separated and recovered by the method according to the present invention is that it is more soluble and compatible with other matrixes than standard lignin usually precipitated from e.g. the cooking liquor.

EXAMPLES

Reference will now be made in detail to the embodiments of the present invention, an example of which is illustrated in the accompanying drawing.

The description below discloses some embodiments of the invention in such a detail that a person skilled in the art is able to utilize the invention based on the disclosure. Not all steps of the embodiments are discussed in detail, as many of the steps will be obvious for the person skilled in the art based on this specification.

FIG. 1 illustrates a method according to one embodiment of the present invention for recovering low molecular weight lignin from a filtrate.

The filtrate to be treated by the method according to the present invention is a filtrate obtained from a process where lignin is precipitated and separated from black liquor. I.e. main part of the lignin in the black liquor is recovered by a first precipitation process resulting in lignin cakes of high molecular weight lignin and in a filtrate comprising low molecular weight lignin being formed. The filtrate can be pretreated, if needed, before being subjected to the method steps of the present invention. E.g. hydrogen sulphide can be removed by aeration from the filtrate before the pH of the filtrate is adjusted.

Following various preparations, step a) is carried out by adjusting the pH of the filtrate to a value of 3-4. Step a) is carried out at a temperature of 50-70° C. Antifoaming agent can be added to the filtrate in order to facilitate the pH adjustment and mixing. As a result of the adjustment of the pH of the filtrate the lignin is precipitated.

After step a) step b) is carried out by separating the precipitated lignin from the filtrate. Step b) can be carried out by alternative manners, i.e. bi) or bii). Step bi) comprises letting the filtrate treated in accordance with step a) to stand for 5-20 hour, preferably 16 hours, where after the precipitated lignin is filtrated using a vacuum filter or a pressure filter. The above delay time enables the formation of lignin particles which are suitable to be filtrated from the filtrate. Step bii) comprises letting the precipitated lignin to settle down and then syphoning off the excess filtrate.

As a result of step b), i.e. step bi) or step bii), lignin cakes are formed. These separated lignin cakes are reslurried in step c) at a temperature of 50-70° C. until the dry solids content of the slurry is 25-40 weight-%. Further, the pH of the slurry is adjusted to a value of 2-3, e.g. 2.5. The slurry is mixed for 15 minutes-5 hours at the above temperature after which the slurry is diluted with water having a temperature of 20-70 C (step d)) and the slurry is vigorously mixed for 0.5-5 hours.

After washing the slurry in step d), the lignin is separated from the slurry in step e) by allowing the lignin to settle down for 2-16 hours and then syphoning off excess washing water.

The yield of low molecular weight lignin obtained is about 30-40 weight-%. The separated lignin can further be dried e.g. at 60° C. and ground to a desired particle size.

Example 1—Recovering Low Molecular Weight Lignin from a Filtrate

In this example lignin was recovered in accordance with the embodiment presented in FIG. 1.

The filtrate from which the low molecular weight lignin was to be separated from was obtained from a process, where high molecular weight lignin is precipitated and separated from black liquor and where the lower molecular weight lignin is ending up in a resulting filtrate. The residual lignin content of the filtrate was about 14 weight-% of dry matter. The lignin content was determined by measuring the absorbance of a sample mixed with alkali with a UV-Vis spectrophotometer at 280 nm and by comparing the received value with a standard. The filtrate comprised lignin molecules, each of which had a molecular weight of 3000 g/mol or lower. The molecular weight was determined by size-exclusion-chromatography (Dionex).

This type of lignin was precipitated by adjusting the pH of the filtrate to 3-4 by adding sulphuric acid to the filtrate. The concentration of the sulphuric acid was 50 weight-%. By the use of such a high concentration gratuitous dilution of the filtrate was avoided. Antifoaming agent was also added to the filtrate. The precipitation of the lignin in the filtrate took place at a temperature between 50 to 70° C.

After a delay time of about 16 hours, the precipitated lignin was separated from the filtrate by vacuum filtering. Alternative manners for separating the precipitated lignin from the filtrate include the use of a pressure filter, syphonating off the excess filtrate after the precipitated lignin has been allowed to settle down or the precipitated lignin could be removed from the bottom of settling basin by screw conveyor.

The separated lignin cakes were reslurried at a temperature of 50-70° C. such that the dry solids content of the slurry was about 30 weight-%. The pH of the slurry was adjusted to about 2.5 by adding 25% sulphuric acid. The pH adjusted slurry was mixed for about 1 hour at a temperature of 50-70° C.

Then the dry solids content of the slurry was adjusted to 5 weight-% by adding washing water and the slurry was vigorously mixed for about 30 minutes after which the lignin was allowed to settle down for 14 hours. Then excess washing water was syphoned off.

The yield of low molecular weight lignin recovered by the method was 39 weight-%.

The formed lignin cakes were dried at a temperature of 60° C. and ground to a desired particle size.

Example 2—The Use of the Recovered Low Molecular Weight Lignin in the Production of a Binder Composition In this example a binder composition was produced using the lignin recovered in accordance with example 1. The following components and their amounts were used:

| | concentration | amount (g) |
|---|---|---|
| water | | 179 |
| NaOH-I | 50% | 102 |
| HMW-lignin fraction | 97% | 146 |

|  | concentration | amount (g) |
| --- | --- | --- |
| LMW-lignin fraction | 97% | 72 |
| phenol (polymerizable substance) | 90% | 123 |
| formaldehyde (crosslinking agent) | 40% | 370 |
| NaOH-II | 50% | 51 |

The HMW-lignin fraction (high molecular weight lignin fraction) was obtained from black liquor as a result of an ordinary lignin precipitation process as discussed above, which results in lignin cakes comprising high molecular weight lignin and in filtrate comprising low molecular weight lignin being formed. The LMW-lignin fraction (low molecular weight lignin fraction) comprised lignin recovered according to example 1.

Firstly, water, the first part of NaOH (NaOH-I) and HMW-lignin were mixed under heating such that a dispersion was formed. Then the temperature was adjusted to 50° C., the phenol was added and then the formaldehyde was added in a stepwise manner during a period of one hour. The temperature was kept under 75° C. After the formaldehyde had been added the second part of the NaOH (NaOH-II) was added. After the addition of NaOH-II, the composition was cooked at 75° C. until the viscosity of the composition was 100 cP. Then the LMW-lignin was added to the composition. The cooking was continued at the temperature of 75° C. until the viscosity of the formed composition was about 305 cP. Then the composition was cooled resulting in a final viscosity of 350 cP. The viscosity was measured at a temperature of 25° C.

In this example, phenol and formaldehyde are used as examples of polymerizable substance and crosslinking agent, respectively. However, any other polymerizable substance or crosslinking agent can be equally well used in the binder composition production method. The polymerizable substance can be selected e.g. from a group consisting of phenol, cresol, resorcinol and combinations thereof, bio-based hydroxyphenols and their derivatives, lignin and tannin. The crosslinking agent can be selected e.g. from a group consisting of an aldehyde, a derivative of an aldehyde, an aldehyde forming compound and combinations thereof. The crosslinking agent can be selected e.g. from a group consisting of formaldehyde, hexamethylenetetramine, paraformaldehyde, trioxane, aromatic aldehyde, glyoxal, furfuryl alcohol, caprolactam, glycol compounds and any combinations thereof. The aromatic aldehyde can be furfuryl aldehyde.

Example 3—Preparing an Adhesive Composition

In this example the binder composition produced in example 2 was used for the production of an adhesive composition. The binder composition was mixed with extenders, fillers, catalysts, additives, as examples of which e.g. starch, wood flour and hardener (e.g. tannin or carbonates) can be mentioned, thus forming the adhesive composition.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A method for recovering low molecular weight lignin from a filtrate, wherein the low molecular weight lignin comprises lignin molecules having a molecular weight of 3000 g/mol or lower, wherein the filtrate is obtained from a process where most of the high molecular weight lignin present in a black liquor is precipitated from the black liquor and the formed precipitate is separated therefrom by filtration resulting in the filtrate comprising low molecular weight lignin being formed, and in that the method comprises the following steps:
   a) adjusting the pH of the filtrate directly to a value of 3-4 for precipitating lignin in the filtrate;
   b) separating the precipitated lignin from the filtrate;
   c) reslurrying the separated lignin at a temperature of 50-70° C. until the dry solids content of the slurry is 25-40 weight-% and adjusting the pH of the slurry to a value of 2-3;
   d) washing the slurry; and
   e) separating the lignin from the slurry.

2. The method according to claim 1, wherein step b) comprises adjusting the pH of the filtrate by using an acidifying agent.

3. The method according to claim 2, wherein the concentration of the acidifying agent is 30-60 weight-%.

4. The method according to claim 2, wherein the concentration of the acidifying agent is 45-55 weight-%.

5. The method according to claim 2, wherein the concentration of the acidifying agent is about 50 weight-%.

6. The method according to claim 1, wherein the pH of the filtrate is adjusted in step a) by adding sulphuric acid and/or sodium sesquisulfate to the filtrate.

7. The method according to claim 1, wherein step a) further comprises adjusting the temperature of the filtrate to 50-70° C.

8. The method according to claim 1, wherein step a) further comprises adding antifoaming agent to the filtrate.

9. The method according to claim 1, wherein step b) comprises separating the precipitated lignin from the filtrate by a vacuum filter or a pressure filter after a delay time of 5-15 hours.

10. The method according to claim 1, wherein step b) comprises separating the precipitated lignin from the filtrate by allowing the precipitated lignin to settle down and then syphoning off the excess filtrate.

11. The method according to claim 1, wherein step d) of washing the slurry comprises diluting the slurry with water until the dry solids content of the slurry is below 20 weight-% and mixing the slurry for 0.5-5 hours.

12. The method according to claim 11, wherein step d) washing the slurry comprises diluting the slurry with water until the dry solids content of the slurry is below 10 weight-%.

13. The method according to claim 11, wherein step d) washing the slurry comprises diluting the slurry with water until the dry solids content of the slurry is about 5 weight-%.

14. The method according to claim 11, wherein step d) washing the slurry comprises mixing the slurry for 0.5-2 hours.

15. The method according to claim 1, wherein step e) of separating lignin from the slurry comprises allowing lignin to settle down and then syphoning off the excess liquid.

16. The method according to claim 15, wherein the method further comprises step f) of drying the lignin separated from the slurry.

17. The method according to claim 16, wherein the method further comprises step g) of grinding the dried lignin.

18. The method of claim 1 further comprising a step prior to step (a) of precipitating lignin from black liquor and separating the formed lignin precipitate by filtration resulting in the filtrate.

* * * * *

UNITED STATES PATENT AND TRADEMARK OFFICE
CERTIFICATE OF CORRECTION

PATENT NO. : 9,982,004 B2
APPLICATION NO. : 14/420845
DATED : May 29, 2018
INVENTOR(S) : Sanna Valkonen et al.

Page 1 of 1

It is certified that error appears in the above-identified patent and that said Letters Patent is hereby corrected as shown below:

On the Title Page

Item (30) "Foreign Application Priority Data", insert --Aug. 24, 2012, (FI) 20125880--.

Signed and Sealed this
Tenth Day of July, 2018

Andrei Iancu
*Director of the United States Patent and Trademark Office*